United States Patent
Brownstein et al.

(10) Patent No.: US 11,791,634 B2
(45) Date of Patent: Oct. 17, 2023

(54) GRID-TIE SYSTEM FOR AC GENERATORS

(71) Applicant: XFlow Energy Company, Seattle, WA (US)

(72) Inventors: Ian D. Brownstein, Seattle, WA (US); Benjamin W. Strom, Seattle, WA (US); Jason A. Mavis, Seattle, WA (US)

(73) Assignee: XFlow Energy Company, Seattle, WA (US)

( * ) Notice: Subject to any disclaimer, the term of this patent is extended or adjusted under 35 U.S.C. 154(b) by 0 days.

(21) Appl. No.: 17/735,499

(22) Filed: May 3, 2022

(65) Prior Publication Data

US 2022/0360087 A1 Nov. 10, 2022

Related U.S. Application Data (60) Provisional application No. 63/183,842, filed on May 4, 2021.

(51) Int. Cl.
*H02J 3/38* (2006.01)
*H02J 3/32* (2006.01)
*H02M 7/48* (2007.01)

(52) U.S. Cl.
CPC ............... *H02J 3/381* (2013.01); *H02J 3/32* (2013.01); *H02M 7/4807* (2013.01); *H02J 2300/24* (2020.01); *H02J 2300/28* (2020.01)

(58) Field of Classification Search
CPC .......... H02J 3/381; H02J 3/32; H02J 2300/24; H02J 2300/28; H02M 7/4807

USPC ......................................................... 307/142
See application file for complete search history.

(56) References Cited

U.S. PATENT DOCUMENTS

| | | |
|---|---|---|
| 10,355,490 B2 * | 7/2019 | Lin .................... H02S 40/38 |
| 2011/0198935 A1 | 8/2011 | Hinman et al. |
| 2012/0281444 A1 | 11/2012 | Dent |
| 2012/0326516 A1 | 12/2012 | Gurunathan et al. |
| 2013/0234520 A1 | 9/2013 | Dierksheide et al. |
| 2015/0214787 A1 | 7/2015 | Gerhardinger et al. |
| 2015/0229131 A1 | 8/2015 | Gerhardinger |
| 2016/0226254 A1 | 8/2016 | Cheng et al. |
| 2017/0033564 A1 | 2/2017 | Lin et al. |

* cited by examiner

*Primary Examiner* — Hal Kaplan
(74) *Attorney, Agent, or Firm* — Dorsey & Whitney LLP (57) ABSTRACT

An exemplary renewable-energy system including a back end system coupled to an isolated DC power source and a generator powered by a renewable energy source and including first circuitry configured to convert first AC power from the generator to DC power and to provide the DC power to a DC power bus, the first circuitry further configured to initiate operation using power from the isolated DC power source. The example system further includes a front end system comprising an inverter coupled to an isolated DC power source generator. The inverter includes a ground isolation monitor interrupter (IMI) circuit coupled to the DC power bus and configured to receive the DC power and convert the DC power to second AC power for provision to a power grid. The isolated power source generator ground-isolates third AC power of the power grid for conversion to DC power for the isolated DC power source.

33 Claims, 7 Drawing Sheets

GRID-TIE SYSTEM FOR AC GENERATORS

CROSS-REFERENCE TO RELATED APPLICATION

This application claims the filing benefit of U.S. patent application Ser. No. 63/183,842, filed May 4, 2021. This application is incorporated by reference herein in its entirety and for all purposes.

BACKGROUND OF THE INVENTION

Distributed energy generation, e.g., locating electricity production close to the point of consumption, offers a number of benefits to end users and the grid. When used properly, distributed energy resources can alleviate the load requirements of centralized generation, increasing energy security and grid resilience.

Solar energy has dominated the use of distributed energy resources over the past decade, which has been driven, at least in part, by lower system costs and government incentives. Over the last ten years, utility solar costs have dropped by 70%, while roof-top system costs have dropped by 50%. What is needed is for a wider variety of distributed energy generation technologies to become economically viable.

DETAILED DESCRIPTION

Certain details are set forth below to provide a sufficient understanding of embodiments of the present disclosure. However, it will be clear to one skilled in the art that embodiments of the present disclosure may be practiced without these particular details. Moreover, the particular embodiments of the present disclosure described herein are provided by way of example and should not be used to limit the scope of the disclosure to these particular embodiments. In other instances, well-known circuits, control signals, timing protocols, and software operations have not been shown in detail in order to avoid unnecessarily obscuring the disclosure.

This application includes examples of grid-tie systems for alternating-current (AC) generators that are low-cost and comply with relevant standards for grid-connection, including standards for voltage, frequency, harmonic distortion, etc. In some examples, the AC generators may operate using renewable energy, such as wind, water, hydro, wave, potential, etc., energy. The use of low-cost renewable energy technologies can reduce $CO_2$ emissions, mitigating the negative effects of climate change. Combining technologies that use a variety of energy resources may bring a number of benefits to the electrical grid, including lower transmission losses and congestion, as well as a reduction in total generation fluctuation.

Many non-solar renewable energy resources harness energy by converting rotational mechanical energy to electricity. These resources may include wind, water, hydro, wave, and potential energy. One common component among these systems, in terms of both system cost and regulatory compliance, is the grid-tie system. The grid-tie system may convert energy from the turbine to the voltage, frequency, and phase of the grid power system, while providing important safety functionality. As these requirements have evolved over the past decade, development of non-solar inverters have not kept pace with these power-grid requirements. As a result, renewable energy generation manufacturers are missing systems capable of the power grid requirements and certifying to those standards. The task of developing a system capable of meeting the power grid requirements is a monumental task, especially when compared to the currently limited size of the distributed wind market, and the even smaller wave, micro hydro, hydrokinetic, and gravity storage markets. This has created a barrier to market entry, restricting market expansion, and disincentivizing the development of a certified inverter.

As described, renewable energy resources that are typically harnessed by converting rotational mechanical energy to electricity include wind, hydro (both conventional and hydrokinetic), wave, and potential energy storage. These resources are typically variable in power output, resulting in variable rotation rate and torque on the generator. This variability AC power (e.g., "wild" power) may result in variable voltage, current, and frequency of the AC power produced by the generator. To comply with power grid specifications, the variable AC power may be converted to a stable AC voltage and frequency to match the AC grid or for consumption by power consumers.

One approach to performing this conversion is to first convert the variable AC from the generator to direct current (DC) power, and then convert the DC power back to AC power with appropriate frequency, voltage, and power factor for direct connection to the grid. We refer to the conversion from wild generator AC to DC as the 'back end' and the conversion from DC to AC for delivery to the grid as the 'front end'. The DC interconnection between the front end and back end is referred to as the DC bus. Example implementations for the front end and back end systems may include at least two different architectures.

In a first implementation, the AC generator includes a permanent magnet generator (e.g., requiring no stator excitation current). Therefore, the back end may include a passive (e.g., not actively controlled) rectifier. The front end is then responsible for controlling both the voltage and the current of the entire system. Overspeed of the generator could cause harmful voltages on the DC bus, possibly damaging the front end. Front end systems capable of such control and robust to over-voltage damage may be expensive.

In a second implementation, the back and system includes an active current control inverter. One example of active current control inverter may include an industrial motor variable frequency drive (VFD). VFDs, which can run in regenerative mode (e.g., where electrical power is flowing from the motor to the VFD), can be suitable to control generators. The VFD back end may both convert the wild generator AC to DC and control the generator current. The front end may include a second VFD or similar inverter to convert the power from the DC bus to grid-matched AC power.

Renewable energy generation systems may follow a certain set of standards with regards to grid connection, including voltage and frequency, harmonic distortion, procedures in case of a grid fault, communications, etc. One such standard is UL 1741. An important consideration with a typical inverter or VFD is that they do not meet these requirements, or have not undergone the certification process to ensure they are met.

An example solution to this problem is to use a solar inverter as the front end part of the system. Many solar inverters meet and are certified to grid connection standards. Use of a solar inverter as the front end system may rely on an active back end, such as a VFD. An active back end may allow full control of the renewable energy device through control of current and voltage in the generator, while operating connected to a DC bus with a stable voltage. This implementation may also prevent exposing the solar inverter front end to variable DC bus voltages outside of its design range, e.g., a voltage range typically generated by an array of photovoltaic panels.

To operate, an active back end may rely on an energized DC bus to initiate electrical operation. In some examples, a solar inverter may only allow power flow in one direction (e.g., from the DC bus to the grid AC). Therefore, the solar inverter may lack a provision to provide power to the DC bus. This limitation has prevented use of solar inverters for use in other renewable energy systems. In addition, other benefits of being able to provision power from the AC grid to the DC bus during an initialization phase include adding the capability to use induction generators, which may rely on energy to excite the winding in the rotor before power can be generator, and additionally, for using the generator as a motor, such as motoring a wind or water turbine rotor to start up, or lifting a weight in a potential energy battery.

A second limitation with the use of solar inverters in this application is that transformerless solar inverters that meet standards such as UL 1741 and IEC 62109 are required to monitor for isolation of the DC bus positive and negative conductors from ground. This monitoring may preclude a non-isolated connection between the AC grid and the DC bus.

Accordingly, embodiments described herein include a system for using a solar inverter to transfer power generated from an AC generator and controlled by a variable frequency drive (VFD) to the grid.

Figure 1:
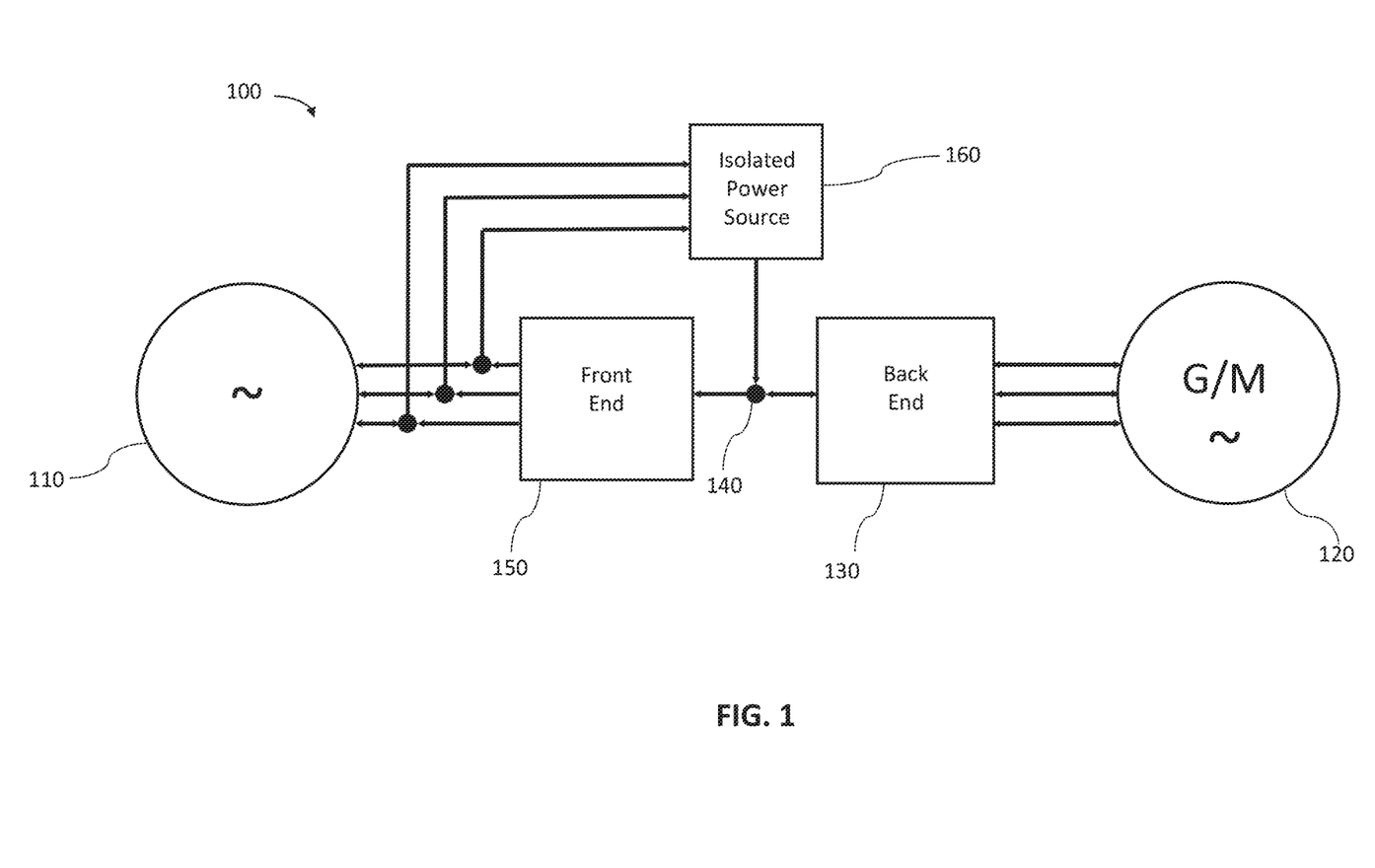
FIG. 1 depicts a schematic block diagram of a grid-tie system for AC generators having a back end system and front end system connected by a direct-current (DC) bus with an isolated power source, in accordance with embodiments of the disclosure.

FIG. 1 depicts a schematic block diagram of a grid-tie system 100 for AC generators having a back end system 130 and front end system 150 connected by a direct-current (DC) bus 140 with an isolated power source 160, in accordance with embodiments of the disclosure. The system 100 includes a back end system 130 coupled to an isolated power source 160 and a generator 120 powered by a renewable energy source. The renewable energy source may include any of wind, hydro, water, wave, or gravity, in some examples. The renewable energy source may include a non-solar energy source. The back end system 130 may include first circuitry to convert first alternating-current (AC) power from the generator 120 to DC power and to provide the DC power to the DC power bus 140. In some examples, the first circuitry may further initiate operation of the generator 120 using power from the isolated DC power source 160. In some examples, the back end system 130 may include an inverter having motoring and regenerative capabilities. In some examples, the inverter includes a variable frequency motor drive. In some examples, the inverter is certified for use in solar renewable energy systems.

The front end system 150 may include an inverter coupled to an isolated power source 160 and/or to the power grid 110. The inverter 150 including a ground isolation monitor interrupter (IMI) circuit coupled to the DC power bus 140 and configured to receive the DC power and convert the DC power to second AC power for provision to a power grid 110. In some examples, the inverter may meet certification requirements use in solar renewable energy systems. In some examples, the inverter may be certified for use in solar renewable energy systems.

The isolated power source 160 may ground-isolate third AC power of the power grid 110 for conversion to DC power.

In some examples, the isolated power source 160 is configured to provide isolated DC power directly to the DC power bus 140. In other examples, the isolated power source 160 is configured to provide isolated AC power to the back end system 130. In some examples, the isolated power source 160 includes an isolation transformer to receive the AC power from the power grid 110 at a primary side and to provide ground-isolated AC power at a secondary side based on the AC power from the power grid 110. In some examples, the isolation transformer may receive AC power from the front end system 150 and provide power to the AC grid 110. In some examples, the system 100 may further include a rectifier to convert the ground-isolated AC power to the DC power to provide an isolated DC power source to the DC power bus 140. In some examples, the isolated power source 160 may include the rectifier. In other examples, the back end system 130 may include the rectifier.

Figure 2:
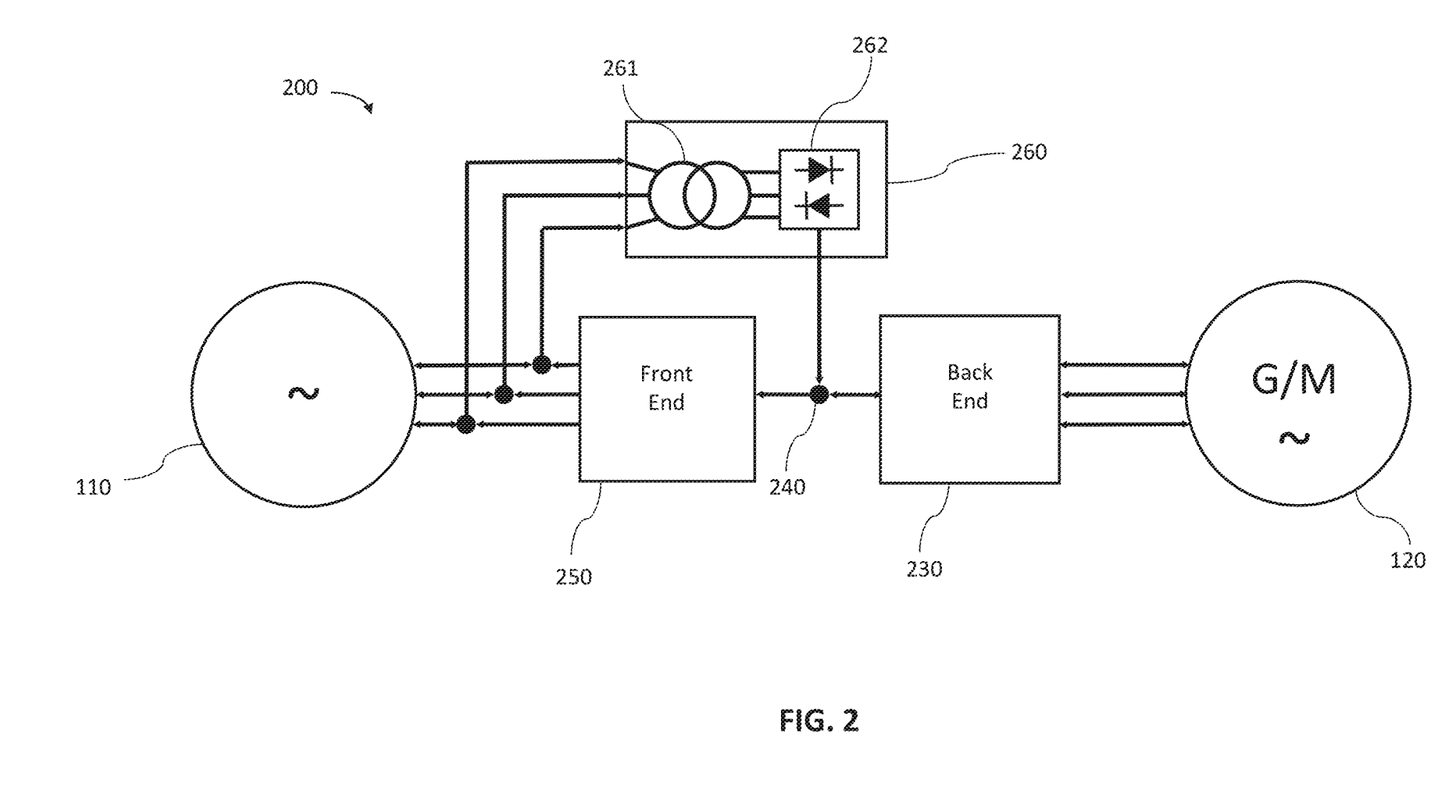
FIG. 2 depicts a schematic block diagram of a grid-tie system for AC generators having a back end system and front end system connected by a DC bus with an isolated power source, in accordance with embodiments of the disclosure.

FIG. 2 depicts a schematic block diagram of a grid-tie system 200 for AC generators having a back end system 230 and front end system 250 connected by a DC bus 240 with an isolated power source 260, in accordance with embodiments of the disclosure. The system 200 may include elements that have been previously described with respect to the system 100 of FIG. 1. Those elements have been identified in FIG. 2 using the same reference numbers used in FIG. 1 and operation of the common elements is as previously described. Consequently, a detailed description of the operation of these particular elements will not be repeated in the interest of brevity.

The system 200 includes a back end system 230 coupled to an isolated direct-current (DC) power source 260 and a generator 120 powered by a renewable energy source. The back end system 230 may include first circuitry to convert first alternating-current (AC) power from the generator 120 to DC power and to provide the DC power to the DC power bus 140. In some examples, the first circuitry may further initiate operation of the generator 120 using power from the isolated power source 260. In some examples, the back end system 230 may include an inverter having motoring and regenerative capabilities. In some examples, the inverter includes a variable frequency motor drive. In some examples, the inverter is certified for use in solar renewable energy systems.

The front end system 250 may include an inverter coupled to an isolated DC power source generator 260 and/or to the power grid 110. The inverter may include a ground isolation monitor interrupter (IMI) circuit coupled to the DC power bus 140 and configured to receive the DC power and convert the DC power to second AC power for provision to a power grid 110. In some examples, the inverter may meet certification requirements use in solar renewable energy systems. In some examples, the inverter may be certified for use in solar renewable energy systems.

The isolated power source generator 260 may ground-isolate AC power from the power grid 110 for conversion to DC power for the isolated DC power source. In some examples, the isolated DC power source 260 may include an isolation transformer 261 and a rectifier 262. The isolation transformer may receive the AC power from the power grid 110 at a primary side and may provide ground-isolated AC power at a secondary side coupled to the rectifier 262 based on the AC power from the power grid 110. The rectifier 262 may convert the ground-isolated AC power to the DC power to provide an isolated DC power source to the DC power bus 140.

Figure 3:
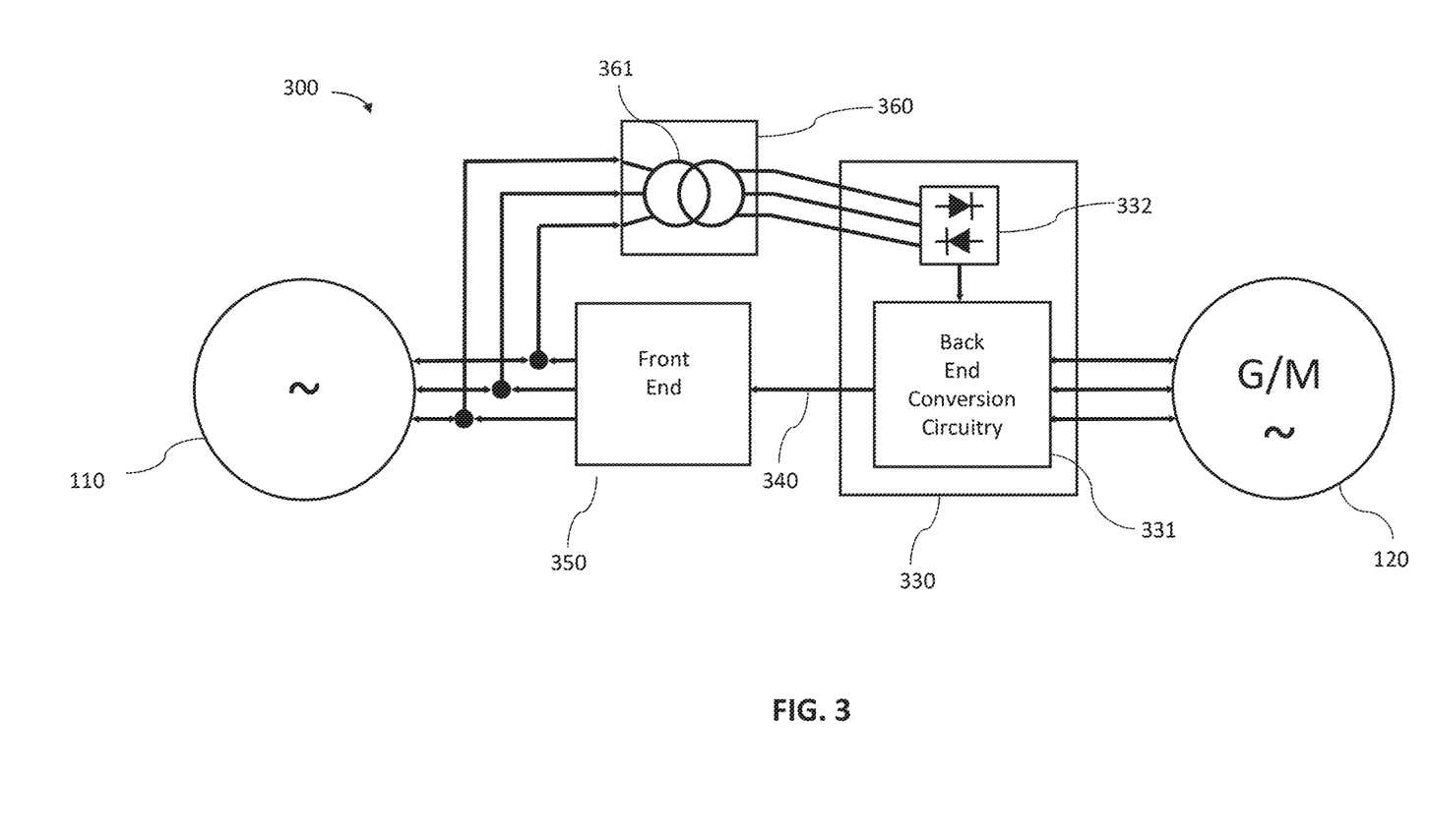
FIG. 3 depicts a schematic block diagram of a grid-tie system for AC generators having a back end system and front end system connected by a DC bus with an isolated power source, in accordance with embodiments of the disclosure.

FIG. 3 depicts a schematic block diagram of a grid-tie system 300 for AC generators having a back end system 330 and front end system 350 connected by a DC bus 340 with an isolated power source 360, in accordance with embodiments of the disclosure. The system 300 may include elements that have been previously described with respect to the system 100 of FIG. 1 and/or the system 200 of FIG. 2. Those elements have been identified in FIG. 3 using the same reference numbers used in FIGS. 1 and/or 2 and operation of the common elements is as previously described. Consequently, a detailed description of the operation of these particular elements will not be repeated in the interest of brevity.

The system 300 includes a back end system 330 coupled to an isolated direct-current (DC) power source 360 and a generator 120 powered by a renewable energy source. The back end system 330 may include back end conversion circuitry 331 to convert first alternating-current (AC) power from the generator 120 to DC power and to provide the DC power to the DC power bus 140. In some examples, the back end conversion circuitry 331 may further initiate operation of the generator 120 using power from the isolated power source 360.

The front end system 350 may include an inverter coupled to an isolated power source 360 and/or to the power grid 110. The inverter may include a ground isolation monitor interrupter (IMI) circuit coupled to the DC power bus 140 and configured to receive the DC power and convert the DC power to second AC power for provision to a power grid 110. In some examples, the inverter may meet certification requirements use in solar renewable energy systems. In some examples, the inverter may be certified for use in solar renewable energy systems.

The isolated power source 360 may ground-isolate third AC power of the power grid 110 for conversion to DC power. In some examples, the isolated power source 360 includes an isolation transformer 361 to receive the AC power from the power grid 110 at a primary side and to provide ground-isolated AC power at a secondary side based on the AC power from the power grid 110. In some examples, the back end system 330 may further include a rectifier 332 to convert the ground-isolated AC power to the DC power to provide an isolated DC power source to the back end conversion circuitry 331.

Figure 4:
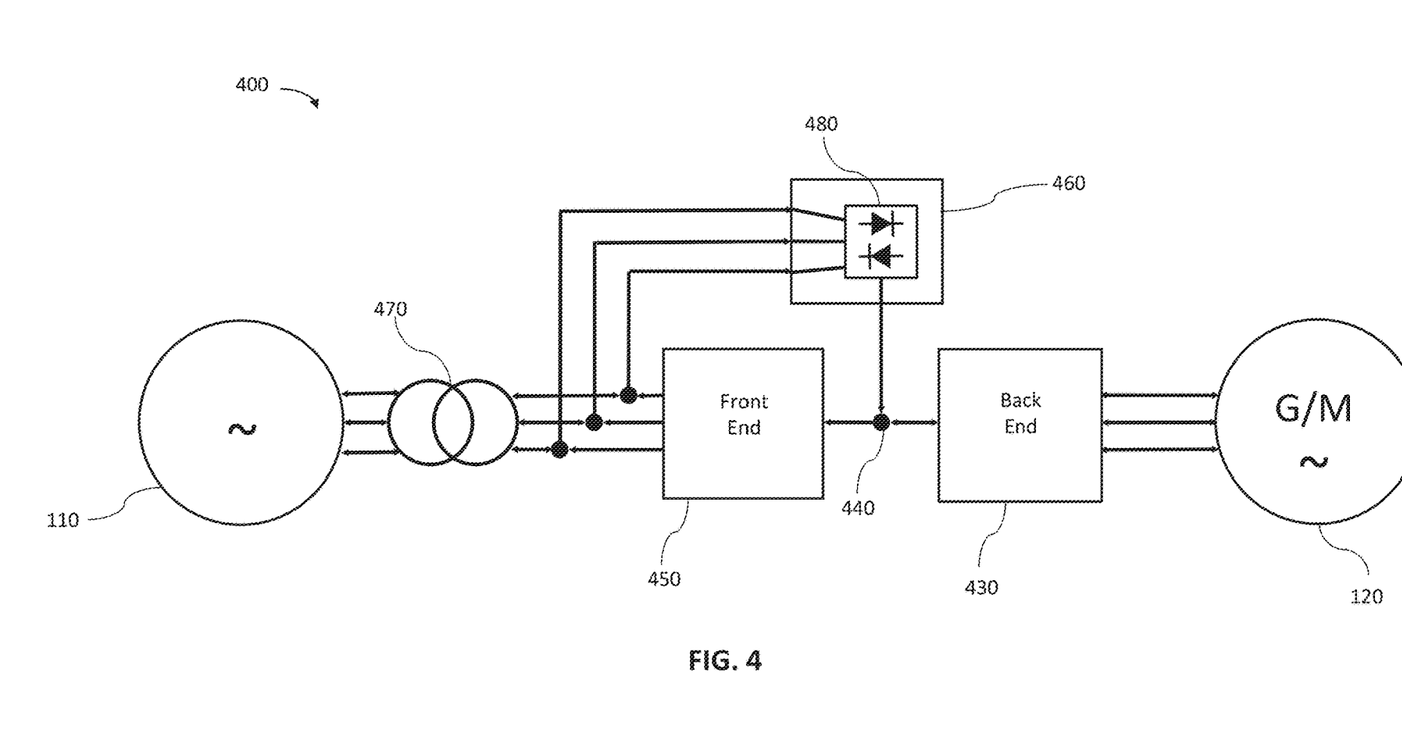
FIG. 4 depicts a schematic block diagram of a grid-tie system for AC generators having a back end system and front end system connected by a DC bus with an isolation transformer between the front end system and a power grid, in accordance with embodiments of the disclosure.

FIG. 4 depicts a schematic block diagram of a grid-tie system 400 for AC generators having a back end system 430 and front end system 450 connected by a DC bus 440 with an isolation transformer 470 between the front end system 450 and a power grid 110, in accordance with embodiments of the disclosure. The system 400 may include elements that have been previously described with respect to the system 100 of FIG. 1, the system 200 of FIG. 2, and/or the system 300 of FIG. 3. Those elements have been identified in FIG. 4 using the same reference numbers used in FIGS. 1, 2, and/or 3 and operation of the common elements is as previously described. Consequently, a detailed description of the operation of these particular elements will not be repeated in the interest of brevity.

The system 400 includes a back end system 430 coupled to an isolated direct-current (DC) power source 460 and a generator 120 powered by a renewable energy source. The back end system 430 may include back end conversion circuitry to convert first alternating-current (AC) power from the generator 120 to DC power and to provide the DC power to the DC power bus 140. In some examples, the back end conversion circuitry may further initiate operation of the generator 120 using power from the isolated power source 460. In some examples, the back end system 430 may include an inverter having motoring and regenerative capabilities. In some examples, the inverter includes a variable frequency motor drive.

In some examples, the isolation transformer 470 may receive AC power from the front end system 450 at a secondary side and may provide power to the AC grid 110 from a primary side. In some examples, the isolation transformer 470 may receive the AC power from the power grid 110 at a primary side and to provide ground-isolated AC power at a secondary side based on the AC power from the power grid 110. The ground-isolated AC power may be provided to the front end system 450 and the isolated power source 460.

The front end system 450 may include an inverter coupled to an isolated power source 460 and to the isolation transformer 470. The inverter my include a ground isolation monitor interrupter (IMI) circuit coupled to the DC power bus 140 and configured to receive the DC power and convert the DC power to second AC power for provision to a power grid 110. In some examples, the inverter may meet certification requirements use in solar renewable energy systems. In some examples, the inverter may be certified for use in solar renewable energy systems.

The isolated power source 460 may further a rectifier 480 to convert the ground-isolated AC power from the isolation transformer 470 to DC power to provide an isolated DC power source to the DC power bus 140.

Figure 5:
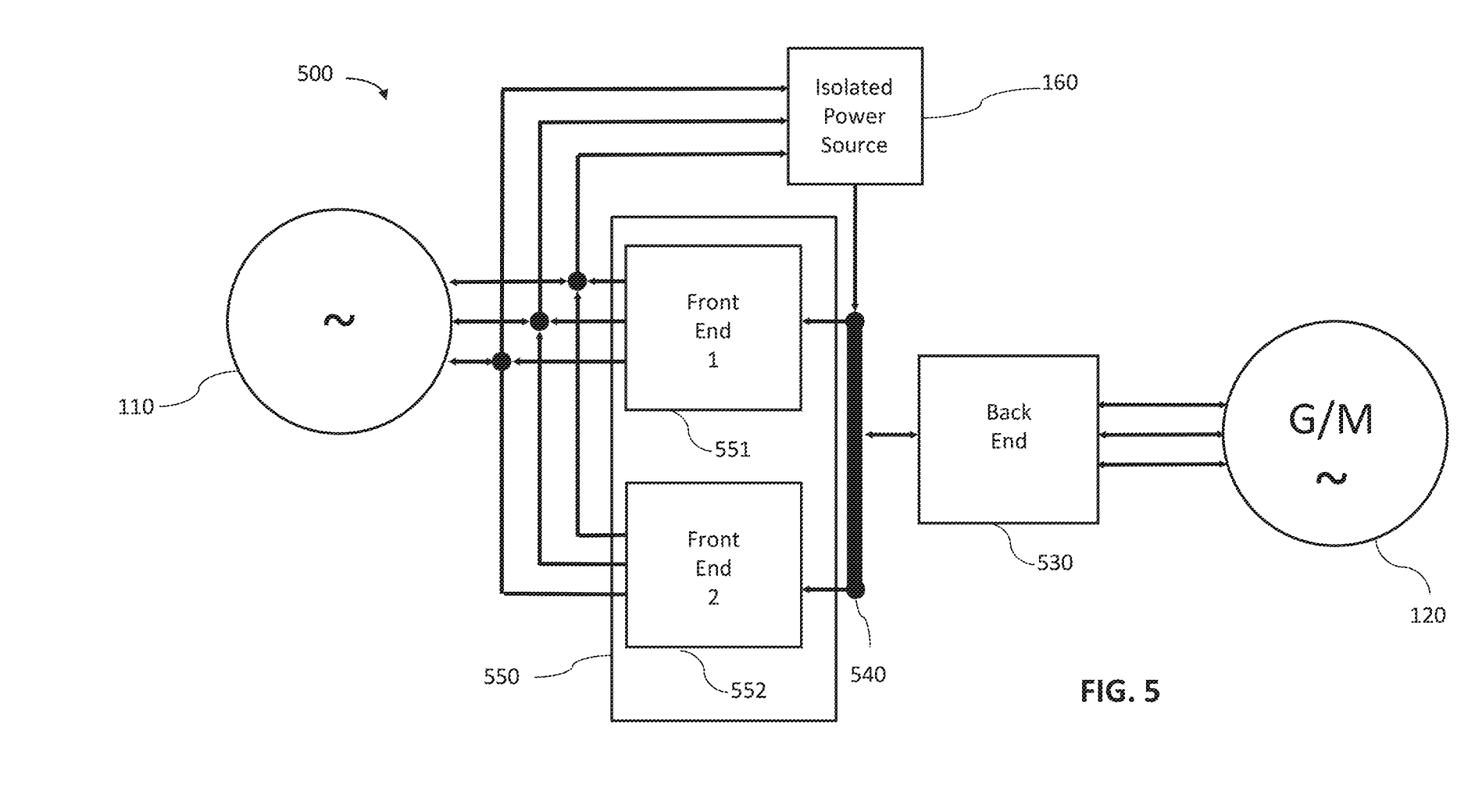
FIG. 5 depicts a schematic block diagram of a grid-tie system for AC generators having a back end system and a front end system connected by a direct-current (DC) bus with an isolated power source, in accordance with embodiments of the disclosure.

FIG. 5 depicts a schematic block diagram of a grid-tie system 500 for AC generators having a back end system 530 and a front end system 550 connected by a direct-current (DC) bus 540 with an isolated power source 160, in accordance with embodiments of the disclosure. The system 500 may include elements that have been previously described with respect to the system 100 of FIG. 1, the system 200 of FIG. 2, the system 300 of FIG. 3, and/or the system 400 of FIG. 4. Those elements have been identified in FIG. 5 using the same reference numbers used in FIGS. 1, 2, 3, and/or 4 and operation of the common elements is as previously described. Consequently, a detailed description of the operation of these particular elements will not be repeated in the interest of brevity.

The system 500 includes a back end system 530 coupled to an isolated power source 160 and a generator 120 powered by a renewable energy source. The back end system 530 may include first circuitry to convert first alternating-current (AC) power from the generator 120 to DC power and to provide the DC power to the DC power bus 140. In some examples, the first circuitry may further initiate operation of the generator 120 using power from the isolated DC power source 160. In some examples, the back end system 530 may include an inverter having motoring and regenerative capabilities. In some examples, the inverter includes a variable frequency motor drive.

The front end system 550 may include a front end circuit 1 551 and a front end circuit 2 552 each having a respective inverter coupled to the power grid 110 and/or to the isolated power source 160. The respective inverters of the front end circuit 1 551 and the front end circuit 2 552 may include a ground isolation monitor interrupter (IMI) circuit coupled to the DC power bus 140 and configured to receive the DC power and convert the DC power to second AC power for provision to a power grid 110. In some examples, the respective inverters may meet certification requirements use in solar renewable energy systems. In some examples, the respective inverters may be certified for use in solar renewable energy systems. While only two front end circuits 551 and 552 are depicted in FIG. 5, it is appreciated that the front end system 550 may include more than two front end circuits without departing from the scope of the disclosure. In the embodiment of FIG. 5, the multiple front end circuits 551 and 552 may increase capacity to transfer power from the DC bus 140 to the power grid 110.

The isolated power source 160 may ground-isolate third AC power of the power grid 110 for conversion to DC power. In some examples, the isolated power source 160 is configured to provide isolated DC power directly to the DC power bus 140. In other examples, the isolated power source 160 is configured to provide isolated AC power to the back end system 530. In some examples, the isolated power source 160 includes an isolation transformer to receive the AC power from the power grid 110 at a primary side and to provide ground-isolated AC power at a secondary side based on the AC power from the power grid 110. In some examples, the isolation transformer may receive AC power from the front end system 550 and provide power to the AC grid 110. In some examples, the system 500 may further include a rectifier to convert the ground-isolated AC power to the DC power to provide an isolated DC power source to the DC power bus 140. In some examples, the isolated power source 160 may include the rectifier. In other examples, the back end system 530 may include the rectifier.

Figure 6:
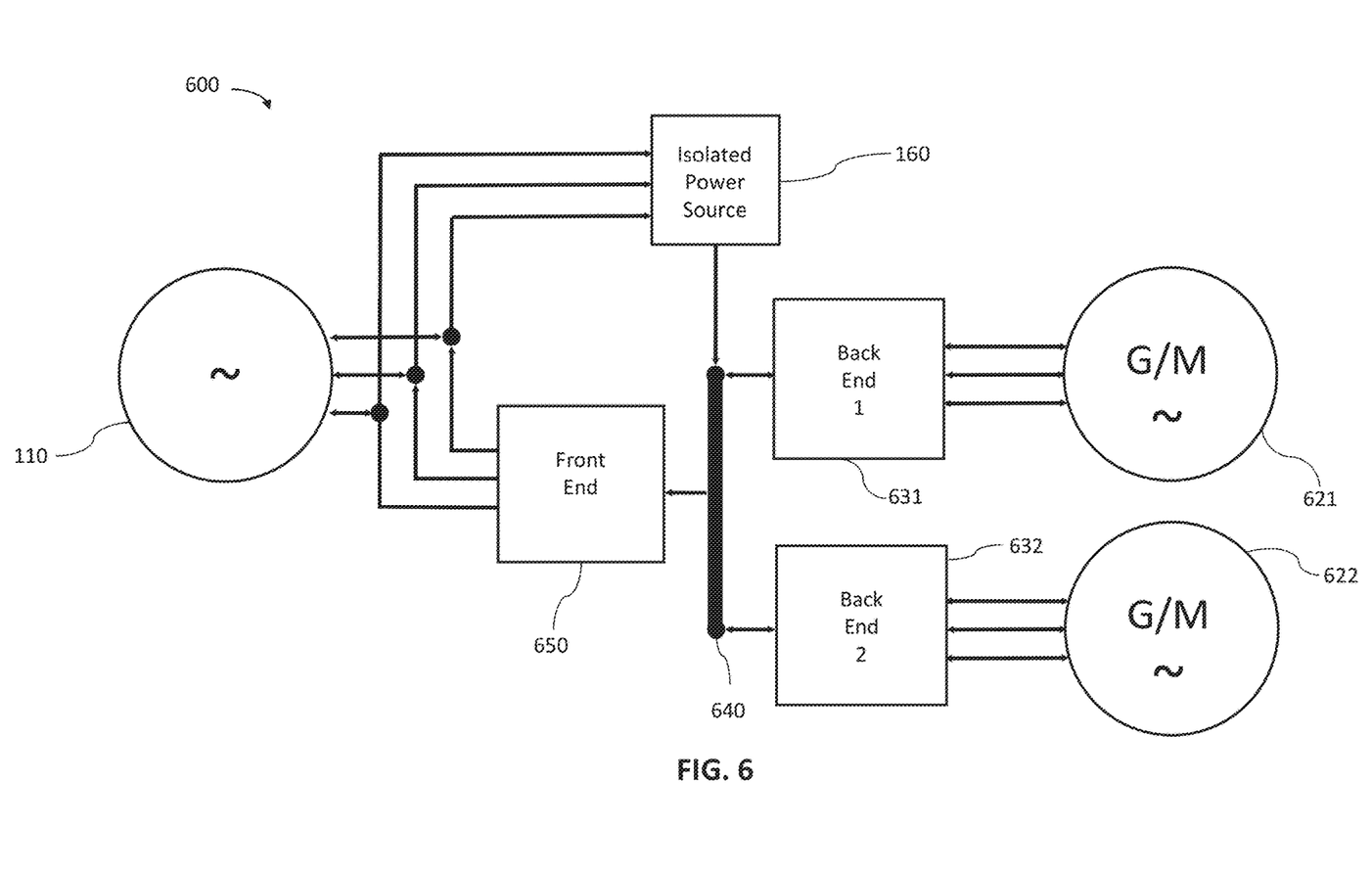
FIG. 6 depicts a schematic block diagram of a grid-tie system for AC generators having a multiple back end systems and a front end system connected by a direct-current (DC) bus with an isolated power source, in accordance with embodiments of the disclosure.

FIG. 6 depicts a schematic block diagram of a grid-tie system 600 for AC generators having multiple back end systems 631 and 632 and a front end system 650 connected by a direct-current (DC) bus 640 with an isolated power source 160, in accordance with embodiments of the disclosure. The system 600 may include elements that have been previously described with respect to the system 100 of FIG. 1, the system 200 of FIG. 2, the system 300 of FIG. 3, system 400 of FIG. 4, and/or the system 500 of FIG. 5. Those elements have been identified in FIG. 6 using the same reference numbers used in FIGS. 1, 2, 3, 4, and/or 5 and operation of the common elements is as previously described. Consequently, a detailed description of the operation of these particular elements will not be repeated in the interest of brevity.

The system 600 includes a back end system 631 and 632 coupled to the DC power bus 140 in parallel. The back end systems 631 and 632 are coupled to a generators 621 or 622, respectively. The generators 621 and 622 may be powered by a renewable energy source. Each of the back end systems 631 and 632 may include respective first circuitry to convert first alternating-current (AC) power from the generator 621 or 622, respectively, to DC power and to provide the DC power to the DC power bus 140. In some examples, the respective first circuitry may further initiate operation of the generator 621 or 622 using power from the isolated DC power source 160. In some examples, the back end systems 631 and 632 may each include an inverter having motoring and regenerative capabilities. In some examples, the inverter includes a variable frequency motor drive. While only two back end systems 631 and 632 and generators 621 and 622 are depicted in FIG. 6, it is appreciated that more than two back end systems and generators may be implemented without departing from the scope of the disclosure. Multiple back end systems 631 and 632 each being coupled between a respective generator 621 and 622 and the DC bus 140 may enable parallel renewable energy systems with a single grid connection.

The front end system 650 may include an inverter coupled to the power grid 110 and/or to the isolated power source 160. The inverter may include a ground isolation monitor interrupter (IMI) circuit coupled to the DC power bus 140 and configured to receive the DC power and convert the DC power to second AC power for provision to a power grid 110. In some examples, the inverter may meet certification requirements use in solar renewable energy systems. In some examples, the inverter may be certified for use in solar renewable energy systems.

The isolated power source 160 may ground-isolate third AC power of the power grid 110 for conversion to DC power. In some examples, the isolated power source 160 is configured to provide isolated DC power directly to the DC power bus 140. In other examples, the isolated power source 160 is configured to provide isolated AC power to the back end systems 631 and 632. In some examples, the isolated power source 160 includes an isolation transformer to receive the AC power from the power grid 110 at a primary side and to provide ground-isolated AC power at a secondary side based on the AC power from the power grid 110. In some examples, the isolation transformer may receive AC power from the front end system 650 and provide power to the AC grid 110. In some examples, the system 600 may further include a rectifier to convert the ground-isolated AC power to the DC power to provide an isolated DC power source to the DC power bus 140. In some examples, the isolated power source 160 may include the rectifier. In other examples, the back end systems 631 and 632 may each include a respective rectifier.

Figure 7:
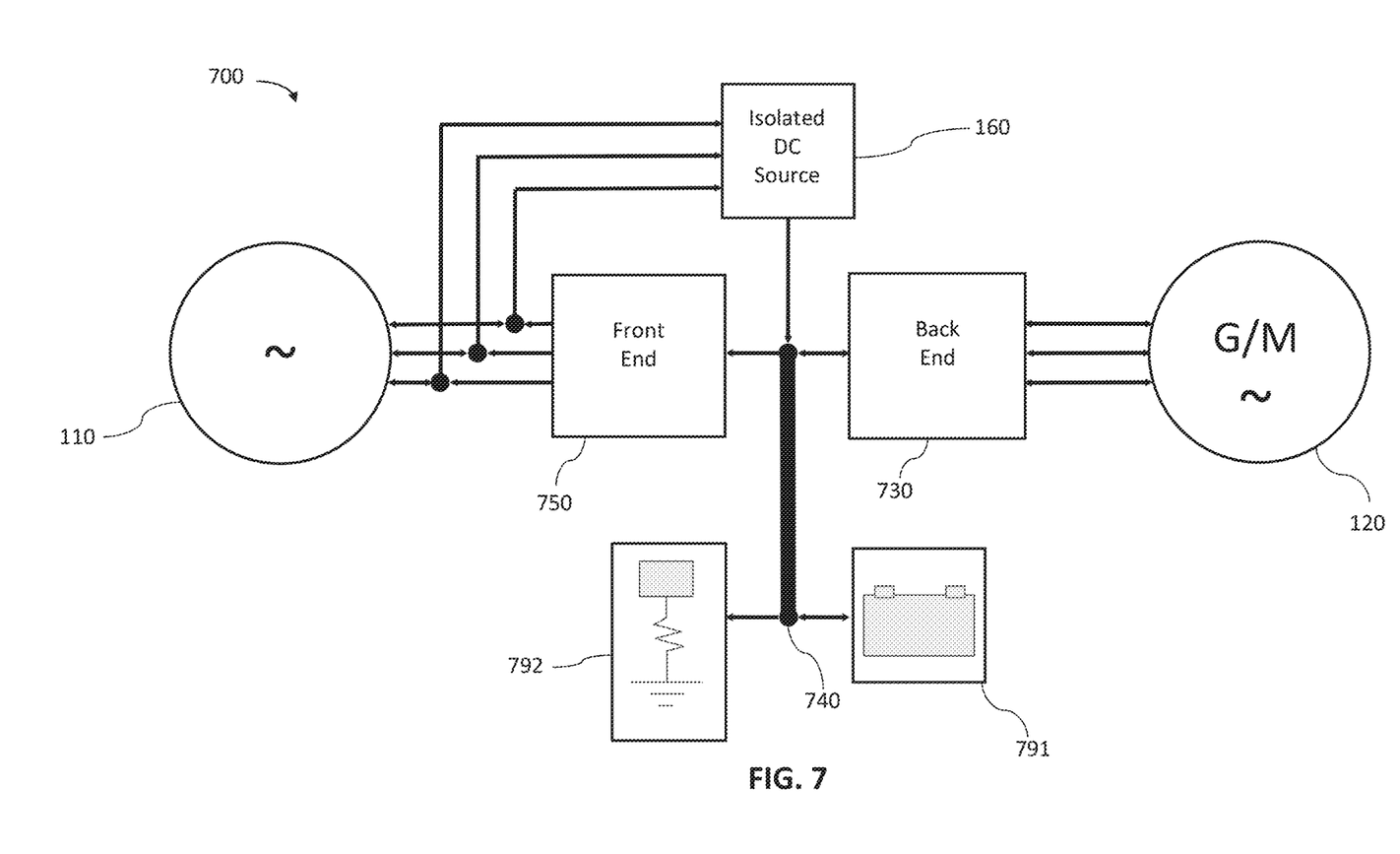
FIG. 7 depicts a schematic block diagram of a grid-tie system for AC generators having a back end system and a front end system connected by a direct-current (DC) bus with an isolated power source, in accordance with embodiments of the disclosure.

FIG. 7 depicts a schematic block diagram of a grid-tie system 700 for AC generators having a back end system 730 and a front end system 750 connected by a direct-current (DC) bus 140 with an isolated power source 160, in accordance with embodiments of the disclosure. The system 700 may include elements that have been previously described with respect to the system 100 of FIG. 1, the system 200 of FIG. 2, the system 300 of FIG. 3, system 400 of FIG. 4, the system 500 of FIG. 5, and/or the system 600 of FIG. 6.

Those elements have been identified in FIG. 7 using the same reference numbers used in FIGS. 1, 2, 3, 4, 5, and/or 6 and operation of the common elements is as previously described. Consequently, a detailed description of the operation of these particular elements will not be repeated in the interest of brevity.

The system 700 includes a back end system 730 coupled to the DC power bus 740 and to a generators 120. The generator 120 may be powered by a renewable energy source. The back end system 730 may include first circuitry to convert first alternating-current (AC) power from the generator 120 to DC power and to provide the DC power to the DC power bus 140. In some examples, the first circuitry may further initiate operation of the generator 120 using power from the isolated DC power source 160. In some examples, the back end system 630 may include an inverter having motoring and regenerative capabilities. In some examples, the inverter includes a variable frequency motor drive.

The front end system 750 may include an inverter coupled to the power grid 110 and/or to the isolated power source 160. The inverter may include a ground isolation monitor interrupter (IMI) circuit coupled to the DC power bus 140 and configured to receive the DC power and convert the DC power to second AC power for provision to a power grid 110. In some examples, the inverter may meet certification requirements use in solar renewable energy systems. In some examples, the inverter may be certified for use in solar renewable energy systems.

The isolated power source 160 may ground-isolate third AC power of the power grid 110 for conversion to DC power. In some examples, the isolated power source 160 is configured to provide isolated DC power directly to the DC power bus 140. In other examples, the isolated power source 160 is configured to provide isolated AC power to the back end system 730. In some examples, the isolated power source 160 includes an isolation transformer to receive the AC power from the power grid 110 at a primary side and to provide ground-isolated AC power at a secondary side based on the AC power from the power grid 110. In some examples, the isolation transformer may receive AC power from the front end system 750 and provide power to the AC grid 110. In some examples, the system 700 may further include a rectifier to convert the ground-isolated AC power to the DC power to provide an isolated DC power source to the DC power bus 140. In some examples, the isolated power source 160 may include the rectifier. In other examples, the back end system 730 may include the rectifier.

The system 700 may further include a power dissipating dump load 792 that is selectively coupled to the DC power bus 140. The power dissipating dump load 792 may be configured to dissipate excess power on the DC power bus 140.

The system 700 may further include a battery and battery charging circuitry 791 each selectively coupled to the DC power bus. For example, when coupled to the DC power bus, the battery charging circuitry of the battery and battery charging circuitry 791 may charge the battery using at least some power received from the DC power bus (e.g., during normal operation to ensure the battery is ready for use). In addition, when coupled to the DC power bus, the battery of the battery and battery charging circuitry 791 may provide power to the DC power bus (e.g., during an initialization process to power the back end system 750).

It is appreciated that the embodiments depicted and described with reference to FIGS. 1-7 may be combined without departing from the scope of the disclosure. For example, the systems 500, 600, and/or 700 of FIGS. 5, 6, and 7, respectively, may be configured to implement any of the isolated power sources 260, 360 (and rectifier 332), or 460 (including the isolation transformer 470) of FIGS. 2, 3, and 4, respectively. In addition, any of the systems 100, 200, 300, 400, 500, and 600 of FIGS. 1-6, respectively, may implement the power dissipating dump load 792 and/or the battery and battery charging circuitry 791 of the system 700 of FIG. 7. The system 500 of FIG. 5 with two (or more) front end circuits 551 and 552 may be combined with the system 600 of FIG. 6 including two (or more) back end systems 631 and 632 and generators 621 and 622 without departing from the scope of the disclosure.

Although the detailed description describes certain preferred embodiments and examples, it will be understood by those skilled in the art that the scope of the disclosure extends beyond the specifically disclosed embodiments to other alternative embodiments and/or uses of the embodiments and obvious modifications and equivalents thereof. In addition, other modifications which are within the scope of the disclosure will be readily apparent to those of skill in the art. It is also contemplated that various combination or sub-combination of the specific features and aspects of the embodiments may be made and still fall within the scope of the disclosure. It should be understood that various features and aspects of the disclosed embodiments can be combined with or substituted for one another in order to form varying mode of the disclosed embodiments. Thus, it is intended that the scope of at least some of the present disclosure should not be limited by the particular disclosed embodiments described above.

What is claimed is:

1. A system comprising:
   a back end system coupled to an isolated direct-current (DC) power source and a generator powered by a renewable energy source and comprising first circuitry configured to convert first alternating-current (AC) power from the generator to DC power and to provide the DC power to a DC power bus, the first circuitry further configured to initiate operation using power from the isolated DC power source; and
   a front end system comprising an inverter coupled to an isolated DC power source generator, the inverter including a ground isolation monitor interrupter (IMI) circuit coupled to the DC power bus and configured to receive the DC power and convert the DC power to second AC power for provision to a power grid, wherein the isolated power source generator is configured to ground-isolate third AC power of the power grid for conversion to DC power for the isolated DC power source.

2. The system of claim 1, wherein the isolated DC power source generator comprises an isolation transformer configured to receive the third AC power of the power grid at a primary side and to provide ground-isolated third AC power at a secondary side based on the third AC power.

3. The system of claim 2, wherein the isolation transformer is further configured to receive AC power from the front end system and to provide power to the AC grid.

4. The system of claim 2, further comprising a rectifier configured to convert the ground-isolated third AC power to the DC power for the isolated DC power source.

5. The system of claim 4, wherein the isolated DC power source generator includes the rectifier.

6. The system of claim 4, wherein the back end system includes the rectifier.

7. The system of claim 1, wherein the back end system includes a second inverter having motoring and regenerative capabilities.

8. The system of claim 1, wherein the second inverter includes a variable frequency motor drive.

9. The system of claim 8, wherein the inverter is certified for use in solar renewable energy systems.

10. The system of claim 1, wherein the renewable energy source is wind, water, hydro, wave, or gravity.

11. The system of claim 1, further comprising a power dissipating dump load selectively coupled to the DC power bus and configured to dissipate excess power.

12. The system of claim 1, further comprising a battery and battery charging circuitry that are each selectively coupled to the DC power bus, wherein, when coupled to the DC power bus, the battery charging circuitry is configured to charge the battery using at least some power received from the DC power bus, wherein when coupled to the DC power bus, the battery is configured to provide power to the DC power bus.

13. The system of claim 1, wherein the front end system further comprises a plurality of parallel-coupled inverters, including the inverter, to increase capacity to transfer power from the DC bus to the AC grid.

14. The system of claim 1, further comprising a plurality of back end systems each coupled between a respective generator and the DC bus to enable parallel renewable energy systems with a single grid connection.

15. A system comprising:
a back end system coupled to an isolated direct-current (DC) power source and a generator powered by a renewable energy source and comprising first circuitry configured to convert first alternating-current (AC) power from the generator to DC power and to provide the DC power to a DC power bus, the first circuitry further configured to initiate operation using power from the isolated DC power source; and
a front end system comprising a solar inverter certified for use in solar energy systems coupled to an isolated DC power source generator, the solar inverter configured to receive the DC power and convert the DC power to second AC power for provision to a power grid, wherein the isolated power source generator is configured to ground-isolate third AC power of the power grid for conversion to DC power for the isolated DC power source.

16. The system of claim 15, wherein the isolated DC power source generator comprises an isolation transformer configured to receive the third AC power of the power grid at a primary side and to provide ground-isolated third AC power at a secondary side based on the third AC power.

17. The system of claim 16, wherein the isolation transformer is further configured to receive AC power from the front end system and to provide power to the AC grid.

18. The system of claim 16, further comprising a rectifier configured to convert the ground-isolated third AC power to the DC power for the isolated DC power source.

19. The system of claim 18, wherein the isolated DC power source generator includes the rectifier.

20. The system of claim 18, wherein the back end system includes the rectifier.

21. The system of claim 15, wherein the back end system includes a second inverter having motoring and regenerative capabilities.

22. The system of claim 21, wherein the second inverter includes a variable frequency motor drive.

23. The system of claim 15, wherein the renewable energy source is wind, hydro, water, wave, or gravity.

24. The system of claim 15, further comprising a power dissipating dump load selectively coupled to the DC power bus and configured to dissipate excess power.

25. The system of claim 15, further comprising a battery and battery charging circuitry that are each selectively coupled to the DC power bus, wherein, when coupled to the DC power bus, the battery charging circuitry is configured to charge the battery using at least some power received from the DC power bus, wherein when coupled to the DC power bus, the battery is configured to provide power to the DC power bus.

26. The system of claim 15, wherein the front end system further comprises a plurality of parallel-coupled inverters, including the inverter, to increase capacity to transfer power from the DC bus to the AC grid.

27. The system of claim 15, further comprising a plurality of back end systems each coupled between a respective generator and the DC bus to enable parallel renewable energy systems with a single grid connection.

28. A method for converting alternating current (AC) power to an AC power grid, the method comprising:
ground-isolating first AC power of the AC power grid via an isolated power source generator;
converting the ground-isolated AC power to an isolated direct current (DC) power source via the isolated power source generator;
providing the isolated DC power source to a DC bus;
initiating operation of a generator of a renewable energy system using power from the isolated DC power source;
converting second AC power provided by the generator based on input from a renewable energy source to DC power;
providing the DC power to the DC bus;
converting the DC power to third AC power for provision to the AC power grid using an inverter with a ground isolation monitor interrupter (IMI) circuit coupled to the DC bus.

29. The method of claim 28, further comprising:
ground-isolating the first AC power received from the AC power grid using flail an isolation transformer to provide ground-isolated AC power; and
converting the ground-isolated AC power to the ground-isolated DC power via a rectifier.

30. The method of claim 29, wherein the rectifier is included in a back-end converter.

31. The method of claim 28 further comprising converting the second AC power received from the generator to the DC power via an inverter having motoring and regenerative capabilities.

32. The method of claim 28 wherein the inverter is certified for use in solar renewable energy systems.

33. The method of claim 28, wherein the renewable energy system is configured to harvest at least one of wind energy, hydro energy, water energy, wave energy, or gravitational energy.

* * * * *